Aug. 16, 1960 G. DAVIS 2,949,162
CARRIAGE AND DRIVING MECHANISM FOR A MOBILE BOOM MACHINE
Filed Dec. 22, 1955 5 Sheets-Sheet 1

INVENTOR.
George Davis
BY
Attorney.

United States Patent Office 2,949,162
Patented Aug. 16, 1960

2,949,162

CARRIAGE AND DRIVING MECHANISM FOR A MOBILE BOOM MACHINE

George Davis, Benton Harbor, Mich., assignor to Davis Engineering Incorporated, Benton Harbor, Mich.

Filed Dec. 22, 1955, Ser. No. 554,853

1 Claim. (Cl. 180—85)

This invention relates to improvements in carriage and driving mechanism for a mobile boom machine. The principal objects of this invention are:

First, to provide a mobile carriage for a rotatably adjustable boom support which will effectively and rigidly support the turntable of a boom on road wheels so that the turntable and boom can be moved along the ground as the work demands.

Second, to provide a mobile carriage for a boom truck that is extremely rigid and well adapted to support the loads incident to operation of a boom and movement of the carriage and which is easily assembled from standard structural steel parts.

Third, to provide a novel and effective drive connection between the road wheels and the engine of a mobile boom truck mounted on the turntable of the truck.

Fourth, to provide a novel boom truck with an engine swingably mounted on a turntable in which driving power is mechanically transmitted from the engine to the road wheels and in which the steering and braking of the carriage and rotation and operation of the boom are controlled hydraulically or pneumatically.

Other objects and advantages of the invention will be apparent from a consideration of the following description and claims. The drawings, of which there are five sheets, illustrate a highly practical form of the boom truck and its driving connections.

Figure 1:
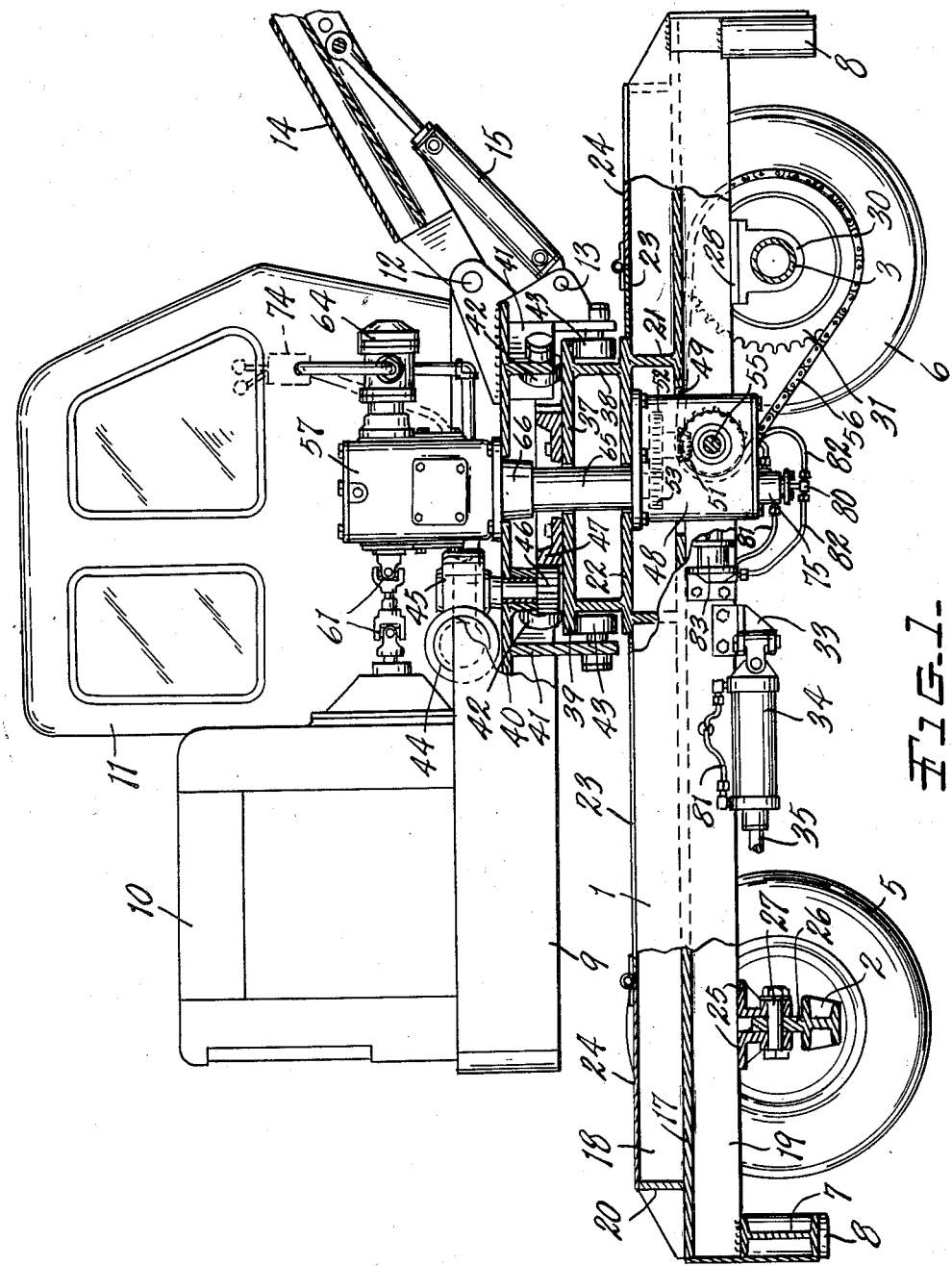
Fig. 1 is a fragmentary side elevational view of a mobile boom truck embodying the features of the invention, parts being broken away in vertically longitudinal section through the middle of the truck.

The mobile boom carriage of the invention consists generally of a chassis 1 having dead axle 2 at one end and a tubular axle 3 at the other end. The dead axle 2 is provided with king pins 4 on which are mounted steerable road wheels 5. The tubular axle 3 rotatably supports dual drive wheels 6. Cross members 7 at each end of the chassis are provided vertical sockets 8 for the reception of jacks or other supports for steadying the chassis during working operations of the machine.

Figure 3:
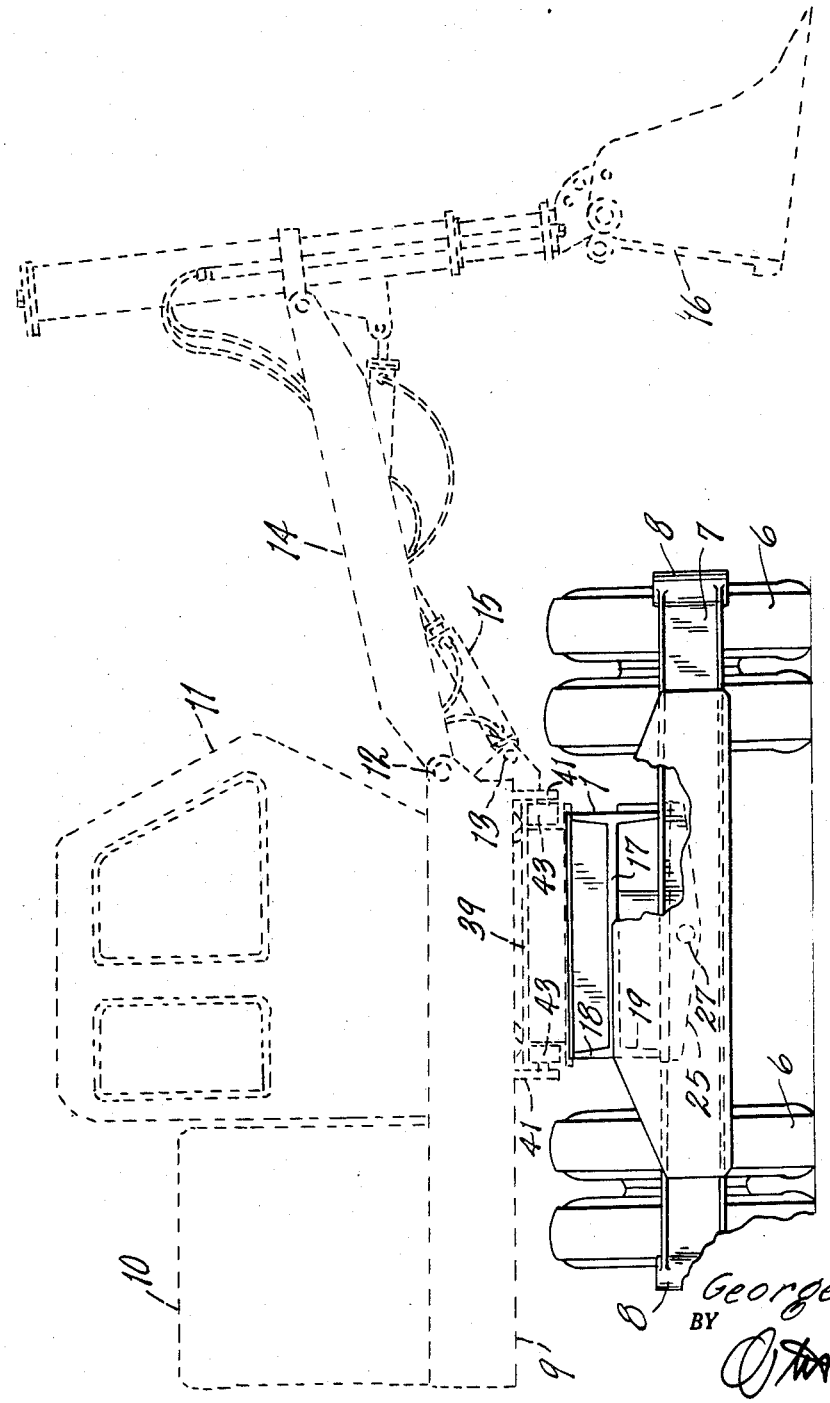
Fig. 3 is an end elevation view of the truck with a portion of the chassis broken away and with the turntable and boom illustrated in dotted lines in adjusted digging position of the turntable and boom.

Rotatably mounted on the chassis is a turntable having a platform 9. The platform 9 supports an internal combustion engine 10 and an operator's cab 11. One end of the platform 9 carries vertically spaced pivots 12 and 13 by means of which a boom 14 having actuating ram 15 are connected to the platform. The boom may be utilized to support and actuate various types of digging or other tools such as the shovel illustrated in dotted lines at 16 in Fig. 3.

Figure 2:
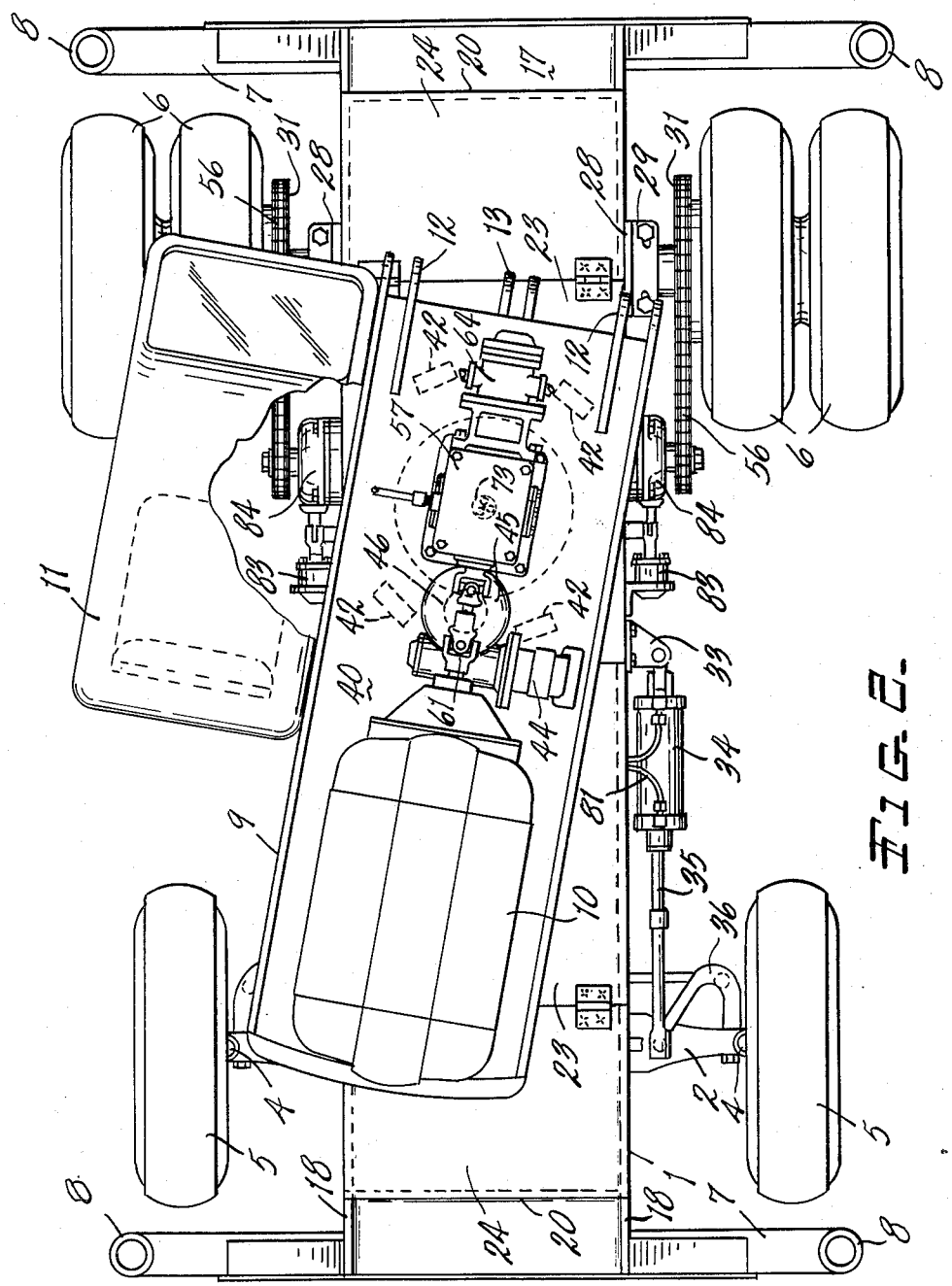
Fig. 2 is a plan view of the truck with the boom removed and with portions broken away.
Figure 4:
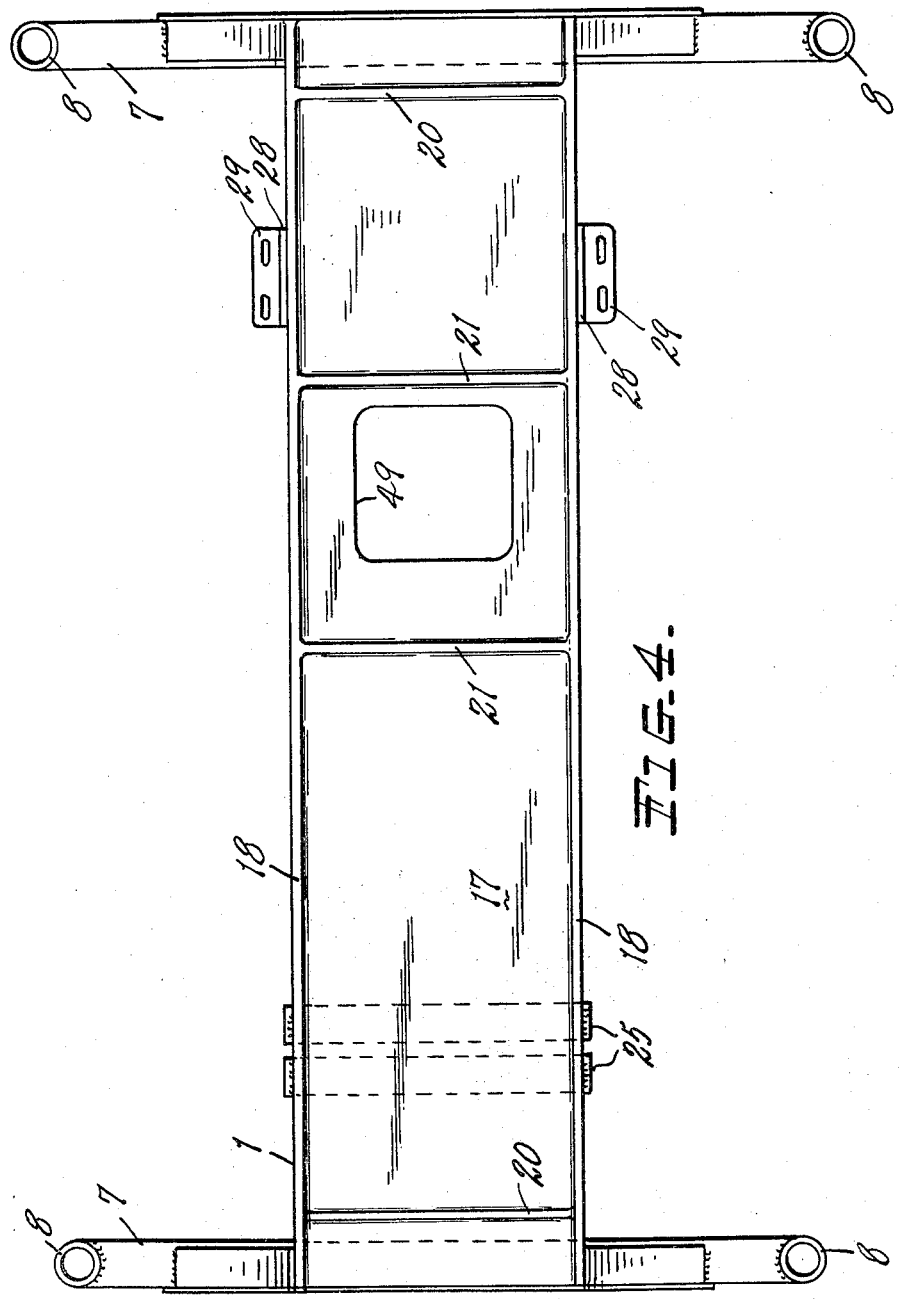
Fig. 4 is plan view of the main chassis element of the carriage with the turntable, road wheels and driving connections removed.
Figure 5:
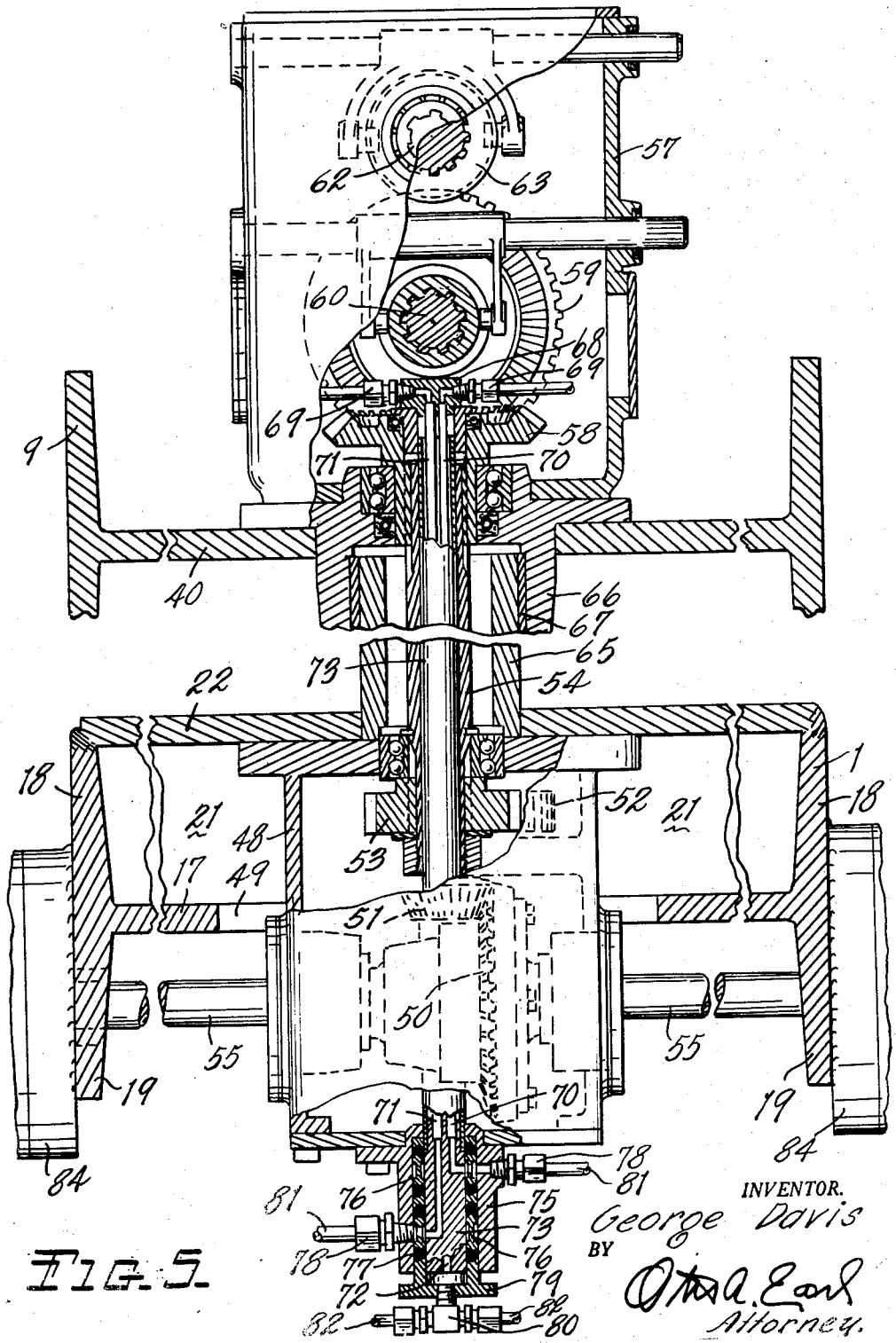
Fig. 5 is an enlarged fragmentary transverse vertical cross sectional view through the drive connections between the turntable and the road wheels of the chassis.

The construction of the chassis 1 and its assembly with the axles is more clearly illustrated in Figs. 2, 4 and 5 which show the chassis to be made up from a broad web I-beam having web 17 and upstanding side flanges 18 and depending side flanges 19. The upstanding flanges 18 are transversely braced and inter-connected by upright cross plates 20 near the ends of the I-beam and by intermediate cross plates 21. The top of the I-beam between these side flanges and the plates 21 is further bridged and reinforced by a heavy bed plate 22 (see Figs. 1 and 5). Where desired the remainder of the I-beam may be boxed in by cover plates 23 having doors 24 therein to form tool boxes in the top of the chassis.

Secured to the depending flanges 19 toward one end thereof are a pair of transverse angle bars 25 having spaced depending flanges between which an ear 26 on the dead axle 2 is longitudinally retained. A horizontal pivot pin 27 connects the ear with the cross bars 25 so that the dead axle will support the end of the chassis while permitting relative tilting of the chassis with respect to the dead axle.

Secured to the sides of the depending flanges 19 toward the opposite end thereof from the dead axle are angle brackets 28 having outwardly projecting flanges 29. The flanges 29 are slotted to adjustably clamp bolster brackets 30 to the undersides of the angle brackets and the bolster brackets 30 non-rotatably support and connect the previously described tubular axle 3 to the chassis. The drive wheels 6 are mounted on the tubular axle by suitable bearings not illustrated, and are provided with drive sprockets 31. A bracket 33 mounted on one side of the chassis pivotally supports a hydraulic steering ram 34 having a piston 35 extending forwardly to the steering arm 36 of the steerable road wheels 5.

The turntable 9 is rotatably supported on the chassis by means of a circular base plate 37 having a depending cylindrical flange 38 welded to the top of the bed plate 22. (See Fig. 1.) The base plate 37 projects beyond the flange 38 in a peripherally extending flange 39. The turntable 9 is also of wide web I-beam section disposed on its sides with the web 40 of the turntable disposed over the base plate 37. Depending from the web 40 of the turntable are a plurality of brackets 41 arranged in a circle and supporting upper rollers 42 and lower rollers 43. The upper rollers 42 ride on top of the base plate 37 while the lower rollers 43 roll underneath the flange 39.

The turntable 9 is rotated on the base plate by means of a hydraulic motor 44 operating through the reduction gear 45 to drive a pinion 46. The pinion meshes with a ring gear 47 bolted to the top of the base plate 37.

The drive connections for transmitting power from the engine 10 to the drive wheel 6 is more clearly illustrated in Figs. 1 and 5. Bolted to the bottom of the bed plate 22 is a differential case 48 that depends through a hole 49 provided therefor in the web of the chassis beam. The differential case 48 is provided with differential gearing 50 connected to be driven by the bevel gear 51 from an intermediate gear 52. (See Fig. 1.) The intermediate gear 52 is driven by a pinion 53 on the lower end of a tubular drive shaft 54. The tubular shaft 54 extends upwardly through the top of the differential case and through the bed plate 22, base plate 37 and the web 40 of the turntable platform. The offset of the differential gearing from the lower end of the tubular shaft leaves the end of the tubular shaft exposed for a purpose to be described presently. The differential gearing 50 is connected to drive the two cross shafts 55 which are connected by chains 56 to the sprockets on the drive wheels.

The upper end of the tubular drive shaft 54 projects through suitable bearings into the bottom of a transmission case 57 secured to the web 40 of the turntable platform. A bevel gear 58 is connected to be driven by change speed gearing 59 from a power shaft 60 extending horizontally through the transmission case. The bevel gear 58 leaves the upper end of the tubular drive shaft exposed as is the lower end of the drive shaft. The power shaft 60 is connected by the universal joints 61 to the crank shaft of the engine 10. The power takeoff shaft 62 and suitable clutch 63 in the transmission case are connected to drive a hydraulic pump 64 mounted on the side of the transmission case from the power shaft 60.

The transmission case 57 and the differential case 48 are held in relatively rotatable vertical alignment about the axis of the drive shaft as the turntable rotates by means of a tubular housing 65 projecting upwardly from the top of the differential case. A collar 66 secured to the bottom of the transmission case and to the web 40 of the turntable depends through the web and around the housing 65. A bearing 67 permits rotation of the collar and the turntable about the upper end of the tubular housing. Non-rotatably mounted in the transmission case and positioned in the center of the bevel gear 58 is a coupling block 68 having a plurality of hydraulic couplings 69 mounted thereon. The coupling block connects with three conduits 70, 71 and 72 formed in the control column 73 extending axially and relatively rotatably through the tubular drive shaft 54 and downwardly through the exposed lower end of the drive shaft through the bottom of the differential case 48. The hydraulic couplings 69 are connected by suitable conduits to control valves 74 mounted in the cab 11 and the control valves 74 are in turn connected to the output of the hydraulic pump 64. One of the control valves 74 is connected to the hydraulic motor 44 to regulate turning motion of the turntable and other control valves not specifically illustrated are connected to control the hydraulic ram 15 and other hydraulically operated mechanisms on the vehicle.

Bolted to the bottom of the differential housing and surrounding the lower end of the control column 73 is a packing box 75. Two seal rings 76 positioned within the packing box and sealed at their ends by packings 77 afford hydraulic communication between the conduits 70 and 71 and couplings 78 on the packing box. A packing gland or nut 79 clamps the packings 77 in place and carries a coupling 80 that communicates with the conduit 72. The couplings 78 and 80 thus have hydraulic connection to the control valve 74 regardless of the rotated position of the turntable 9. The couplings 78 are connected by conduits 81 to the previously described steering cylinder 34 to hydraulically steer the vehicle. The coupling 80 is connected by conduits 82 to hydraulic cylinders 83 mounted on the sides of the chassis. The cylinders 83 are connected to actuate brake mechanisms 84 mounted on the ends of the cross shafts 55. The operator in the operator's cab is thus able to control the running, steering and stopping of the vehicle as well as the rotation of the turntable and operation of the boom therein in any rotated position of the turntable on the chassis. All drive and control connections are easily accessible and easily assembled for economy in both maintenance and manufacture. The chassis as described is rigid and relatively inexpensively fabricated from standard structural steel.

The example of the operating and control elements illustrated employs hydraulic power throughout but it will be appreciated that other fluid power and controls such as an air compressor and air valves may be substituted for operating any part or all of the fluid actuated elements. The brakes and steering in particular may be advantageously operated pneumatically because of less rigid cushioning action of an air cylinder as compared to a hydraulic cylinder.

Having thus described the invention, what is claimed as new and is desired to be secured by Letters Patent is:

A boom carriage comprising a chassis formed of a wide web I-beam disposed on its side, a dead axle pivotally mounted intermediate of its ends on the underside of one end of the I-beam about a longitudinally extending horizontal axis, steerable road wheels on the ends of said axle, a fixed axle on the other end of said I-beam, drive wheels rotatably mounted on the ends of said fixed axle, a bed plate welded on the tops of the side flanges of the I-beam, a differential case secured to the under side of said bed plate and depending through a hole provided therefor in the web of said I-beam, a circular base for a turntable welded on top of said bed plate, a turntable rotatably mounted on said base, two transversely extending shafts mounted in said differential and supported at their outer ends by the lower flanges of said I-beam, and chains drivingly connecting said transversely extending shafts to said drive wheels.

References Cited in the file of this patent

UNITED STATES PATENTS

| | | |
|---|---|---|
| 1,851,866 | Quinan | Mar. 29, 1932 |
| 2,035,385 | McLean | Mar. 24, 1936 |
| 2,075,819 | Manly | Apr. 6, 1937 |
| 2,126,404 | McLean | Aug. 9, 1938 |
| 2,152,273 | Otto | Mar. 28, 1939 |
| 2,229,840 | Edwards | Jan. 28, 1941 |
| 2,475,963 | Howell | July 12, 1949 |
| 2,590,787 | Nickles | Mar. 25, 1952 |
| 2,631,737 | Cullen | Mar. 17, 1953 |
| 2,781,134 | Weir et al. | Feb. 12, 1957 |